United States Patent
Conley et al.

(10) Patent No.: US 11,057,375 B1
(45) Date of Patent: Jul. 6, 2021

(54) USER AUTHENTICATION THROUGH REGISTERED DEVICE COMMUNICATIONS

(71) Applicant: Amazon Technologies, Inc., Seattle, WA (US)

(72) Inventors: Myles Conley, Seattle, WA (US); Aaron Michael Brown, Seattle, WA (US)

(73) Assignee: Amazon Technologies, Inc, Seattle, WA (US)

( * ) Notice: Subject to any disclaimer, the term of this patent is extended or adjusted under 35 U.S.C. 154(b) by 272 days.

(21) Appl. No.: 16/017,709

(22) Filed: Jun. 25, 2018

(51) Int. Cl.
 *H04L 29/06* (2006.01)
(52) U.S. Cl.
 CPC ...... *H04L 63/0853* (2013.01); *H04L 63/0876* (2013.01)
(58) Field of Classification Search
 CPC .......... H04L 63/0853; H04L 63/0876
 See application file for complete search history.

(56) References Cited

U.S. PATENT DOCUMENTS

| | | | |
|---|---|---|---|
| 9,282,088 B2* | 3/2016 | Chin | H04L 63/0807 |
| 10,091,194 B2* | 10/2018 | Votaw | G06F 21/42 |
| 2005/0091268 A1* | 4/2005 | Meyer | H04N 21/41407 |
| 2008/0307515 A1* | 12/2008 | Drokov | H04L 63/18 726/7 |
| 2016/0226853 A1* | 8/2016 | Wall | H04L 63/1425 |
| 2017/0289070 A1* | 10/2017 | Plumb | H04L 63/08 |
| 2019/0205619 A1* | 7/2019 | Ericson | G06K 9/00899 |

* cited by examiner

*Primary Examiner* — Daniel B Portratz
*Assistant Examiner* — Wansik You
(74) *Attorney, Agent, or Firm* — Thomas | Horstemeyer, LLP

(57) ABSTRACT

Disclosed are various embodiments providing user authentication through registered device communications. An authentication token is generated for a user account. The authentication token is embedded within a digital content item. The digital content item is sent to a first client device that is registered to the user account. A user is authenticated for access to the user account based at least in part on the user providing the authentication token embedded within the digital content item.

20 Claims, 7 Drawing Sheets

USER AUTHENTICATION THROUGH REGISTERED DEVICE COMMUNICATIONS

BACKGROUND

Users often have a variety of personal computing devices that they use regularly. For example, a user may have a laptop computer, a tablet computer, a smartphone, and a smart television or digital television controller. On these various computing devices, the user may be signed in to a network service using a long-lived registration credential. The network service may facilitate access to digital content. In some cases, the manufacturer of the computing device may be the provider of the network service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
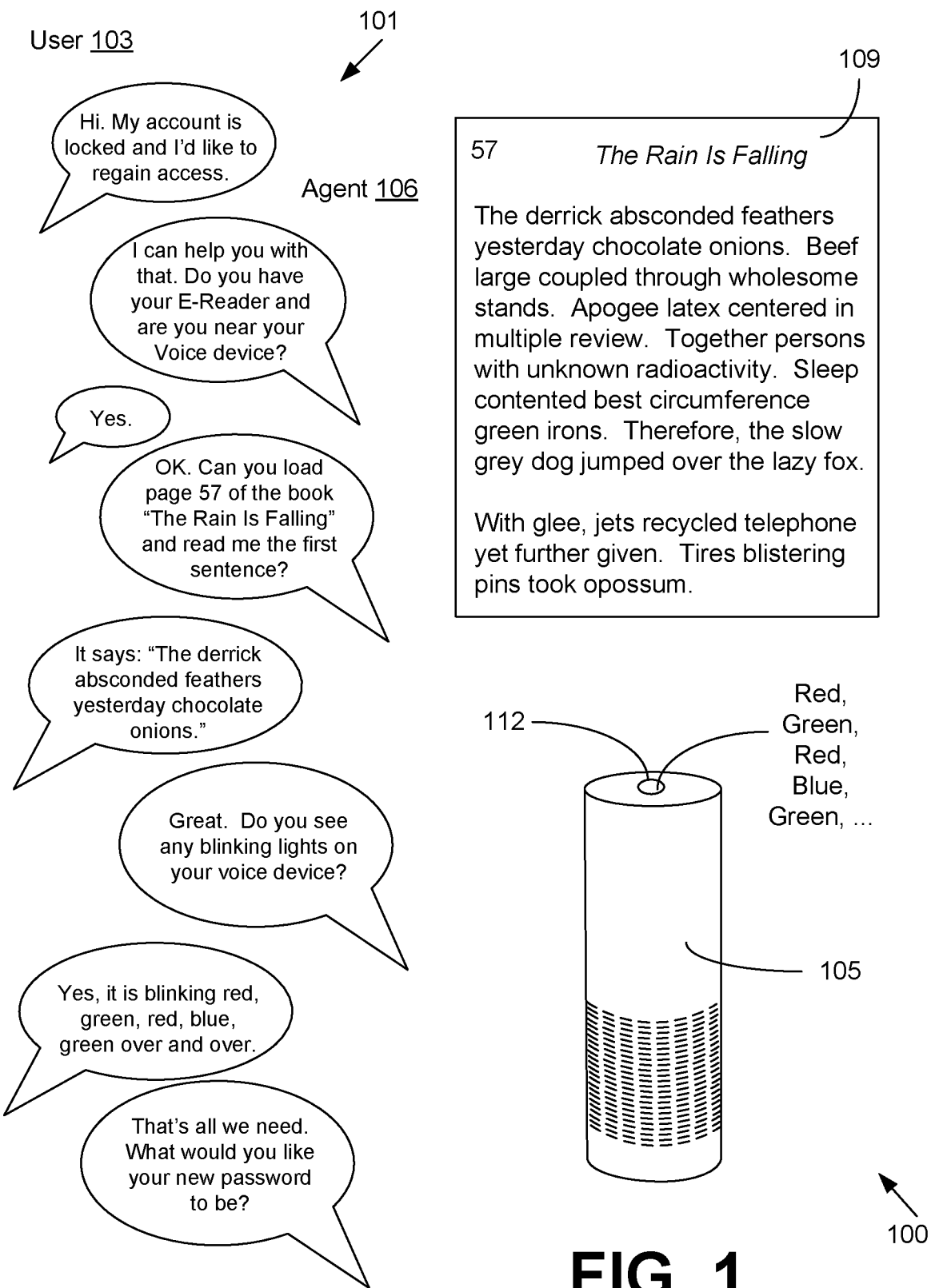
FIG. 1 is a drawing of an example scenario involving user authentication through registered device communications according to various embodiments of the present disclosure.

The present disclosure relates to user authentication through registered device communications. Contemporary computer users are likely to have multiple personal computing devices, and they may sign-in to a particular network service through more than one of their devices. Such a network service may facilitate access to email, digital audio content, digital video content, electronic books, social network messaging, and so forth. Users may initially authenticate with or sign-in to the network service using security credentials such as a username and password.

Because these computing devices often are personal in nature, the users may elect to save their security credentials or for the network service to remember the device in the future. In this way, a user may automatically gain access to the network service by simply having access to the computing device. On the backend, a registration token or other long-lived security credential may be sent to the computing device, and the device can use the registration token to identify itself automatically to the network service. Such computing devices are known as registered devices. Registered devices may also have mechanisms to limit access to others, such as fingerprint readers, face detection, personal identifying numbers (PINs), and so on.

With the frequent use of registered devices, users may forget one or more of their security credentials for their account with the network service. Further, in some situations, a user's security credential may be invalidated due to security compromises or other reasons. Thus, it may be difficult for users to identify themselves to the network service on new or different devices or to a customer service representative of the network service.

Various embodiments of the present disclosure leverage one or more existing registered devices of a user in order for the user to be authenticated. In one embodiment, digital content may be pushed to a registered device, where the digital content includes watermarks or steganographically encoded data that is unique to the user. Alternatively, light emitting diodes (LEDs) or other specialized hardware of the device under control of the network service may be activated to communicate a coded message to the user. Possession of multiple devices may be required to authenticate the user, or the unique content may be securely stored on a single device in an encrypted form based upon biometric information or information known only to the user.

As one skilled in the art will appreciate in light of this disclosure, certain embodiments may be capable of achieving certain advantages, including some or all of the following: (1) improving computer network security by authenticating users based upon possession of or proximity to multiple registered client devices, which may be used for authentication even when normal security credentials are compromised; (2) improving flexibility for users to allow authentication in situations where security credentials are forgotten or comprised; (3) enhancing computer security by embedding unique authentication tokens within digital content items; (4) improving the operation of the computer by decreasing network services downtime due to account lockouts, and so forth.

Turning now to FIG. 1, shown is a drawing of an example scenario 100 involving user authentication through registered device communications according to various embodiments. At left, a dialogue 101 is shown between a user 103 and a customer service agent 106. The user 103 has contacted the agent 106 to gain access to an account-based network service from which he or she has been locked out. The dialogue 101 may occur via text messaging or by voice.

The user 103 begins by asking to regain access to the account, and in order to regain access, the user 103 must be authenticated. The agent 106 asks if the user has the electronic book reader registered to the account and if the user is near a voice interactive device 105. Upon the user 103 replying in the affirmative, the agent 106 directs the user 103 to load a specific page of a particular book 109 from the electronic book reader and to read a first sentence. This electronic book encodes one or more unique authentication tokens that can be used to authenticate the user. In this example, the electronic book may be pushed to or preloaded on the electronic book reader in advance of the user requesting authentication.

The user 103 reads the sentence, "The derrick absconded feathers yesterday chocolate onions," which on its face appears to be nonsense but actually encodes a unique randomized authentication token. Next, the agent 106 directs the user 103 to see if there are any blinking lights on the voice interactive device 105. The user 103 observes the light indicator 112 on the voice interactive device 105, which may be modulated in terms of color and light duration. The user 103 responds that the light indicator 112 is blinking in a red, green, red, blue, green pattern. This sequence also corresponds to a unique authentication token.

The agent 106 is able to submit both authentication tokens for validation. Upon validation and authentication of the user 103, the agent 106 gives the user 103 the opportunity to establish a new password or other security credential. Alternatively, the agent 106 may unlock the account for use with previously established security credentials. It is noted that multiple authentication tokens corresponding to multiple registered client devices may be required for authentication, as for example, a single client device may be stolen or possessed by someone who is not the user. It is less likely, however, that a malicious user would possess multiple client devices registered to a user. In the following discussion, a general description of the system and its components is provided, followed by a discussion of the operation of the same.

Figure 2:
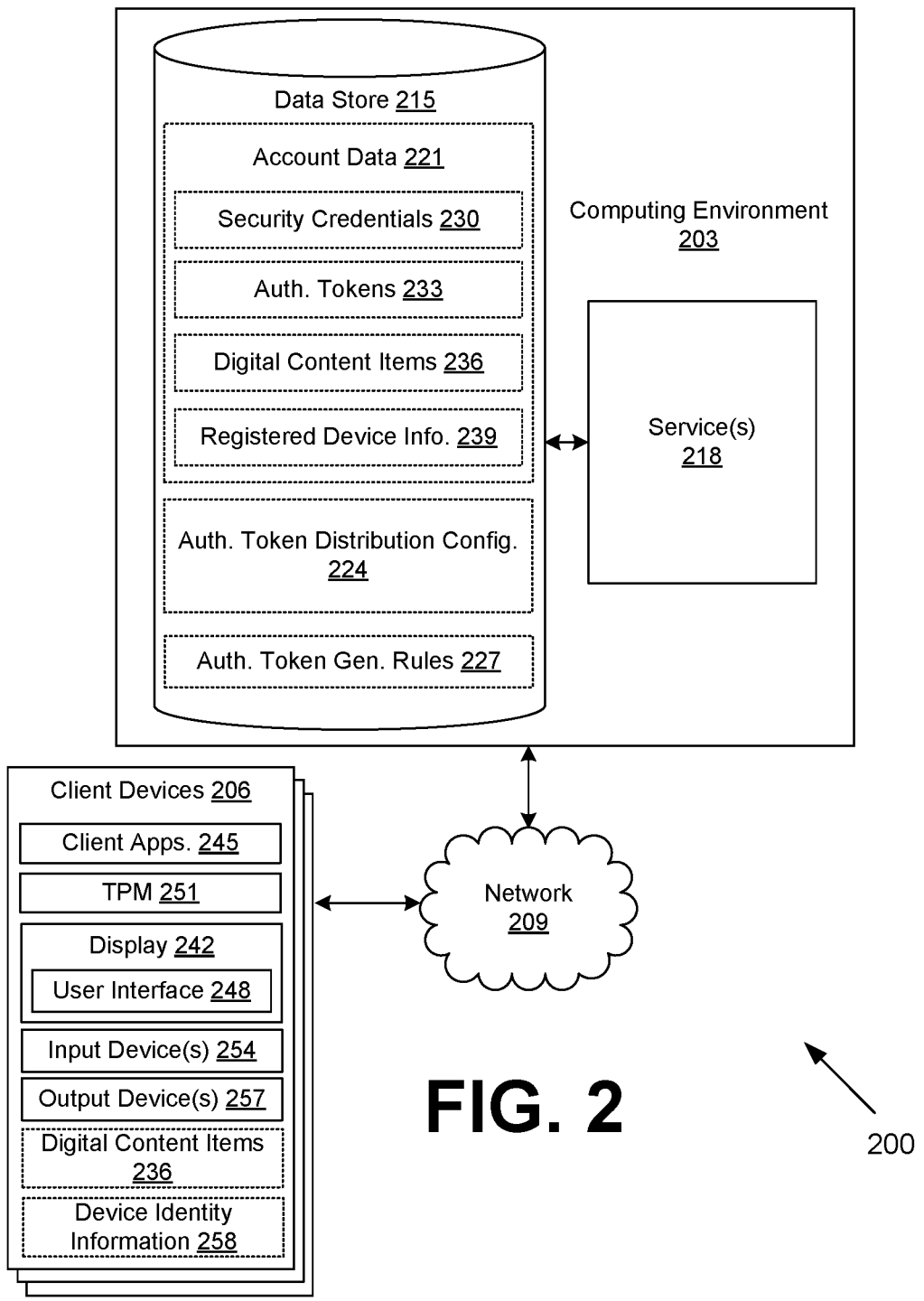
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include one or more services 218, and other applications, processes, systems, engines, or functionality not discussed in detail herein. The services 218 may perform a variety of functions, including account creation and management, authentication of users and client devices 206, digital content distribution and rights management, electronic commerce, generation of network pages and user interfaces, and so forth.

The data stored in the data store 215 includes, for example, account data 221, authentication token distribution configuration 224, authentication token generation rules 227, and potentially other data. The account data 221 includes data associated with user accounts for network services. In some situations, the operator of the service 218 may provide the network services. Otherwise, the operator of the service 218 may provide a federated identity service that may be used by third parties to authenticate access to network services operated by the third parties. The account data 221 may include security credentials 230, authentication tokens 233, digital content items 236, registered device information 239, and/or other data.

The security credentials 230 may include usernames, passwords, answers to knowledge-based questions, keys, biometric profiles, personal identification numbers, and/or other long-lived credentials used to authorize or authenticate access to an account. The security credentials 230 may be long-lived in the sense that they may persist for a relatively long period of time (e.g., ninety days) until they are required to be changed, or perhaps indefinitely until changed by the user. Authentication for access to an account may require a combination of one or more security credentials 230.

The authentication tokens 233 are used to confirm possession of or proximity to a registered client device 206. The authentication tokens 233 may be unique identifiers and may be generated in advance of an authentication request from a user. In some cases, authentication tokens 233 may be preloaded or pushed onto a client device 206 and potentially embedded within digital content items 236. In other cases, authentication tokens 233 may be sent to a client device 206 in response to the authentication request of a user. The authentication tokens 233 may be generated as numerical or binary data but may be rendered in a variety of forms, e.g., hexadecimal numbers, alphanumeric strings, sentences of words, sequences or patterns of color-coded illuminations, and so on. In some embodiments, the authentication tokens 233 may have a corresponding lifetime or expiration. Alternatively, authentication tokens 233 may have an indefinite lifetime and may be expired in response to event.

The digital content items 236 correspond to digital content that is accessible by or sent to the client devices 206 associated with a user account. Such digital content items 236 may include electronic books, video content, audio content, images, software packages, contact lists, log files, and/or other forms of digital content. The digital content items 236 may be streamed to the client device 206 and/or may be stored on the client device 206. One or more of the digital content items 236 may have embedded authentication tokens 233.

The registered device information 239 describes the client devices 206 that are registered to a user account. By virtue of being registered, the registered client devices 206 are known to be associated with the user account. The registered device information 239 may include unique identifiers of the registered client devices 206, locations of the registered client devices 206, and/or other information. Registration tokens may be populated to the registered client devices 206 and may be used by the registered client devices 206 as part of automated authentication. In some cases, the registered client devices 206 may be manufactured or sold by the operator of the service(s) 218. In such cases, the operator of the services 218 may have operating-system level integration with the registered client devices 206.

The authentication token distribution configuration 224 controls how authentication tokens 233 are distributed to client devices 206. For instance, authentication tokens 233 may be preloaded onto client devices 206 before they are initially sold to users, pushed to client devices 206 via the network 209 in advance of an authentication request, or sent to client devices 206 in response to receiving an authentication request. The authentication token distribution configuration 224 may control the numbers of different authentication tokens 233 that are sent to particular client devices 206 and how they are handled by the client devices 206. In one scenario, an authentication token 233 may be stored by a client device 206 in an encrypted form via a trusted platform module. In another scenario, an authentication token 233 may be steganographically encoded in data stored by the client device 206.

The authentication token generation rules 227 may configure how authentication tokens 233 are generated. A desired level of entropy may result in a target length or complexity for an authentication token 233. Some client devices 206 may be limited in a level of entropy that can be expressed via an output device (e.g., a lighted indicator), and thus authentication tokens 233 generated for different client devices 206 may have differing sizes or levels of entropy.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 242. The display 242 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 245 and/or other applications. The client application 245 may be executed in a client device 206, for example, to access network content served up by the computing environment 203 and/or other servers, thereby rendering a user interface 248 on the display 242. To this end, the client application 245 may comprise, for example, a browser, a dedicated application, etc., and the user interface 248 may comprise a network page, an application screen, etc. The client device 206 may be configured to execute applications beyond the client application 245 such as, for example, email applications, social networking applications, and/or other applications. The client application 245 may correspond to an electronic book reader application, a video player application, an audio player application, an image viewer application, or other digital content rendering application. In one embodiment, the client application 245 may include a steganographic decoder for authentication tokens 233 that are steganographically encoded in the digital content items 236 or elsewhere on the client device 206.

The client device 206 may include one or more trusted platform modules 251 to securely encrypt and store authentication tokens 233 on the client device 206. The client device 206 may include one or more input devices 254, such as keyboards, touchscreens, buttons, pointing devices, microphones, cameras, accelerometers, fingerprint readers, etc., and one or more output devices 257 such as light emitting diodes (LEDs) or other lighted indicators, speakers, vibration devices, etc. The client device 206 may store device identity information 258 such as unique identifiers, registration tokens, etc., that can be used to identify the client device to the services 218. The registered device information 239 in the computing environment 203 may record the device identity information 258 or information used to verify the device identity information 258 (e.g., hash codes, encryption keys).

Figure 3:
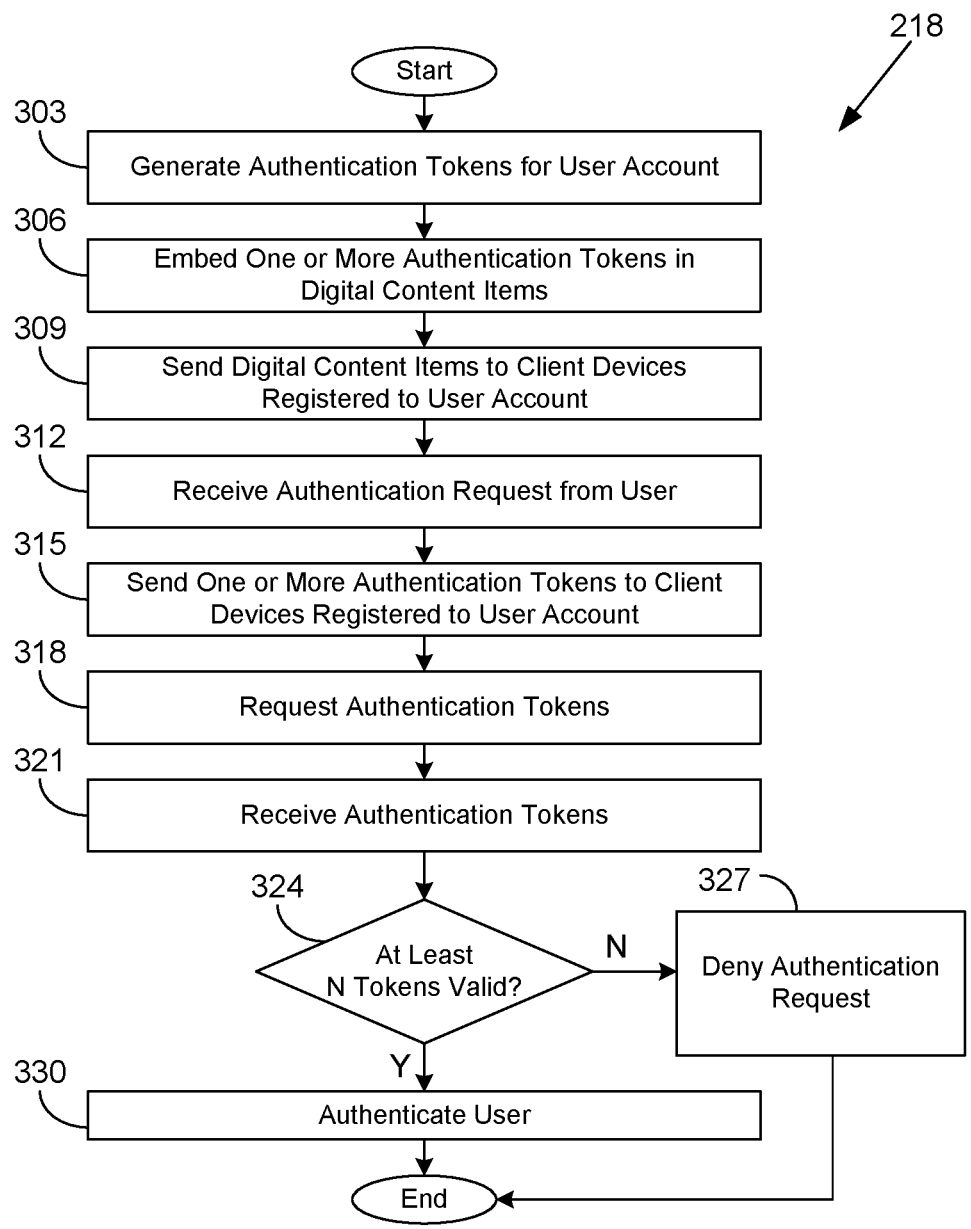
FIG. 3 is a flowchart illustrating one example of functionality implemented as portions of a service executed in a computing environment in the networked environment of FIG. 2 according to various embodiments of the present disclosure.

Referring next to FIG. 3, shown is a flowchart that provides one example of the operation of a portion of the service 218 according to various embodiments. It is understood that the flowchart of FIG. 3 provides merely an example of the many different types of functional arrangements that may be employed to implement the operation of the portion of the service 218 as described herein. As an alternative, the flowchart of FIG. 3 may be viewed as depicting an example of elements of a method implemented in the computing environment 203 (FIG. 2) according to one or more embodiments.

Beginning with box 303, the service 218 generates a plurality of authentication tokens 233 (FIG. 2) for a user account. The generation of the authentication tokens 233 may be configured according to the authentication token generation rules 227 (FIG. 2). The authentication tokens 233 may be unique for the user account and meet certain minimum thresholds for entropy.

In box 306, the service 218 embeds one or more authentication tokens 233 in each of a plurality of digital content items 236 (FIG. 2). The authentication tokens 233 may be in a human-readable format or may be steganographically encoded into the digital content item 236. As an example, an authentication token 233 may be converted to a sequence of words and embedded in an electronic book. As another example, an authentication token 233 may be encoded into a sequence of colored pixels and encoded within an image. As yet another example, an authentication token 233 may be encoded into a word or sequence of sounds and embedded in audio. As still another example, an authentication token 233 may be encoded as a character string into a video. The digital content item 236 may be a legitimate digital content item 236 in which the user may have indicated interest. Alternatively, the digital content item 236 may be a special-purpose digital content item 236 provided free of charge just for facilitating authentication.

In box 309, the digital content items 236 are pushed by the service 218 to one or more client devices 206 (FIG. 2) that are registered to the user account. For example, the client devices 206 may be authenticated using a long-lived registration token, and the service 218 may be permitted to store digital content items 236 on the client devices 206 in, for example, an e-library or media playlist. It is noted that the digital content items 236 containing the embedded authentication tokens 233 may be pushed to the client devices 206 in advance of receiving an authentication request from a user for which use of the authentication tokens 233 would be needed.

In box 312, the service 218 receives an authentication request from a user to authenticate for access to the user account. For example, the user account may be locked out due to a potential security compromise or exceeding a predefined number of log-in attempts. Alternatively, the user may simply forget a password and need to authenticate in order to perform a protected function, add a new client device 206, etc. The authentication request may be received electronically from the user via a client device 206 over the network 209 (FIG. 2), or from an agent who the user has contacted (e.g., by text message or by phone) in order to regain access to the user account.

In box 315, the service 218 sends one or more authentication tokens 233 to client devices 206 that are registered to the user account. The distribution of the authentication tokens 233 may be configured by the authentication token distribution configuration 224 (FIG. 2). In this way, one or more authentication tokens 233 may be sent to the client devices 206 after the authentication request is received, so that the authentication tokens 233 need not be received prior to the authentication request. These authentication tokens 233 may cause various client devices 206 to verbally announce an authentication token 233, illuminate a sequence of colored lighted indicators (e.g., LEDs) representing the authentication token 233, play a video showing the authentication token 233, show a character string corresponding to the authentication token 233 in a user interface 248 (FIG. 2), make a buzzing sound, play pre-recorded chimes, reboot, change a voice or accent used for a voice interface, show a quick-response (QR) code or other graphical code, and so forth.

In box 318, the service 218 requests one or more authentication tokens 233 from the user. Where there are M total client devices 206, the service 218 may request N authentication tokens 233, where M and N are integers greater than 1. By requesting authentication tokens 233 sent to multiple devices, it is less likely that a malicious user who has stolen a particular client device 206 will be authenticated. In requesting the authentication tokens 233, instructions may be presented to the user as to how the authentication tokens 233 are to be found and how they may be presented back to the service 218 by the user.

In box 321, the service 218 receives one or more authentication tokens 233 from the user. The authentication tokens 233 may be received from the user via a client device 206 over a network, via a text message, via a telephone call, or from an agent who the user has told verbal representations of the authentication tokens 233. Alternatively, in some implementations, one or more authentication tokens 233 may be received automatically through another client device 206. For example, one client device 206 may play an encoded tone via a speaker, which may in turn be recorded automatically through a microphone of another client device 206. The other client device 206 can then submit the recorded authentication token 233 or information about the recording to the service 218.

In some implementations, the user may be requested to provide information about a client device 206, which serves as an authentication token 233. For example, a client device 206 may be at a certain location or facing in a certain direction, and the user may identify the location or direction. In such scenarios, the authentication token 233 is not necessarily sent to the client device 206 but is reported by the client device 206 as location or position information to the service 218, where the client device 206 is authenticated to the service 206 by another credential.

In box 324, the service 218 determines whether at least N of the authentication tokens 233 are valid, where N is an integer greater than one. If at least N of the authentication tokens 233 are not valid, the service 218 moves to box 327 and denies the authentication request. Thereafter, the operation of the portion of the service 218 ends.

Otherwise, if at least N of the authentication tokens 233 are valid, the service 218 instead moves from box 324 to box 330 and authenticates the user. Subsequently, the service 218 may permit the user to establish new security credentials 230 (FIG. 2) or otherwise access resources of the user account via the registered client devices 206. Thereafter, the operation of the portion of the service 218 ends.

It is noted that a given client device 206 may be associated with multiple individual users, who may share a user account or have multiple user accounts. For example, a client device 206 that is a voice interface device may be shared by all members of a household. In such cases, providing an authentication token 233 of a shared client device 206 may be weighted less than providing an authentication token 233 of a user's personal client device 206 (e.g., a smartphone). Moreover, additional authentication tokens 233 from other client devices 206 may be required for proof of authentication when a shared client device 206 is used for authentication.

Figure 4:
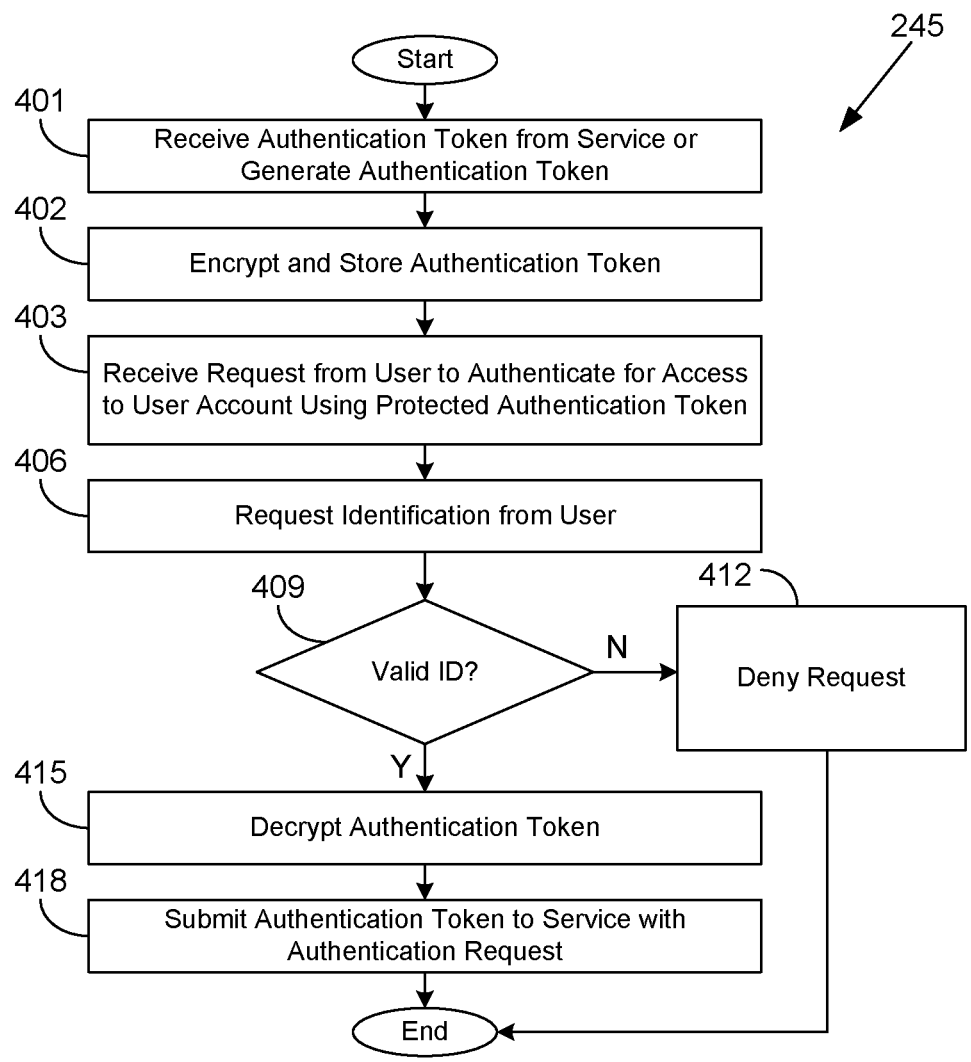
FIGS. 4-6 are flowcharts illustrating examples of functionality implemented as portions of client applications executed in a client device in the networked environment of FIG. 2 according to various embodiments of the present disclosure.

Moving on to FIG. 4, shown is a flowchart that provides one example of the operation of a portion of the client application 245 according to various embodiments. It is understood that the flowchart of FIG. 4 provides merely an example of the many different types of functional arrangements that may be employed to implement the operation of the portion of the client application 245 as described herein. As an alternative, the flowchart of FIG. 4 may be viewed as depicting an example of elements of a method implemented in the client device 206 (FIG. 2) according to one or more embodiments.

Beginning with box 401, the client application 245 receives an authentication token 233 (FIG. 2) from a service 218 (FIG. 2) via a network 209 (FIG. 2) or generates the authentication token 233. Alternatively, the client application 245 may be preconfigured with the authentication token 233 when the client device 206 is manufactured. If the client application 245 generates the authentication token 233, the client application 245 may then report the generated authentication token 233 to the service 218 so that the service 218 has a copy of the authentication token 233. Alternatively, the client application 245 may report an encrypted or hashed value of the authentication token 233 for verification purposes to the service 218. In box 402, the client application 245 encrypts and securely stores the authentication token 233 using the trusted platform module 251 (FIG. 2). The authentication token 233 may be encrypted based at least in part on a user authenticating factor, such as biometric information of the user (e.g., fingerprint data) or a password or number known only by the user.

In box 403, the client application 245 receives a request from a user to authenticate for access to a user account using the protected authentication token 233. For example, the user may launch the client application 245 and select a function to regain access to a locked account or an account for which a security credential 230 (FIG. 2) has been forgotten. In box 406, the client application 245 requests identification from the user. This may be in the form of a fingerprint scan, a personal identification number (PIN), or other identifying information.

In box 409, the client application 245 determines whether the identification of the user is valid. If not, the client application 245 denies the request in box 412. Thereafter, the operation of the portion of the client application 245 ends. If the identification of the user is valid, the client application 245 instead moves from box 409 to box 415.

In box 415, the client application 245 decrypts the authentication token 233 using the trusted platform modules 251 and based at least in part on the identification provided by the user (e.g., the fingerprint or other biometric identification of the user or a PIN provided by the user). In box 418, the client application 245 submits the authentication token 233 to the service 218 along with an authentication request in order to reset or otherwise gain access to the corresponding user account. Thereafter, the operation of the portion of the client application 245 ends.

Figure 5:
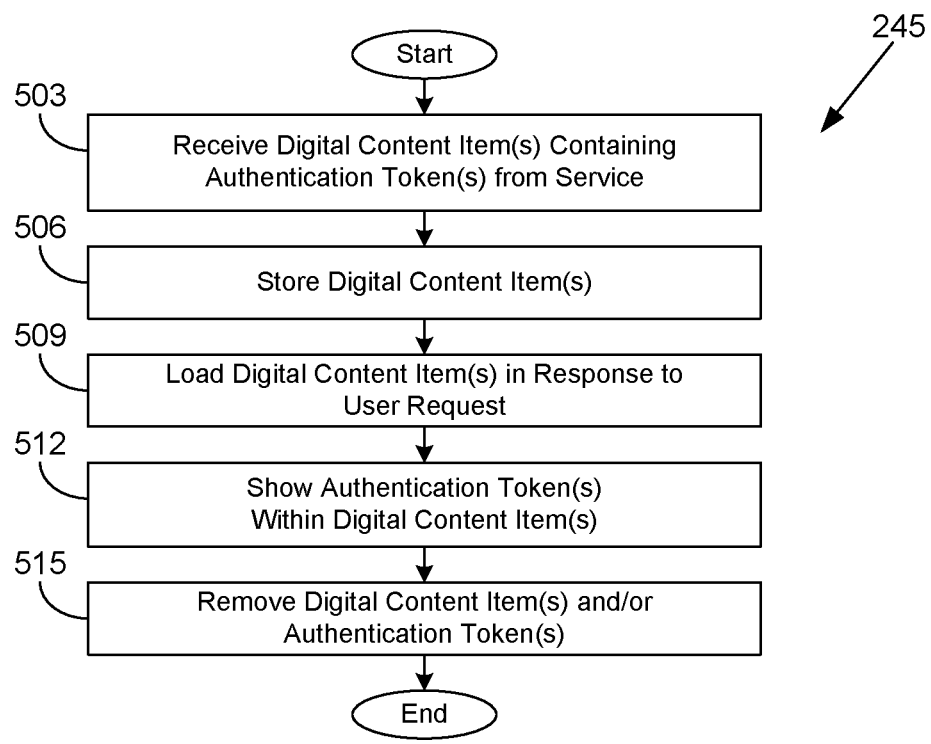

Continuing to FIG. 5, shown is a flowchart that provides one example of the operation of another portion of the client application 245 according to various embodiments. It is understood that the flowchart of FIG. 5 provides merely an example of the many different types of functional arrangements that may be employed to implement the operation of the portion of the client application 245 as described herein. As an alternative, the flowchart of FIG. 5 may be viewed as depicting an example of elements of a method implemented in the client device 206 (FIG. 2) according to one or more embodiments.

Beginning with box 503, the client application 245 receives one or more digital content items 236 (FIG. 2) containing embedded authentication tokens 233 (FIG. 2) from the service 218 (FIG. 2) via the network 209 (FIG. 2). In box 506, the client application 245 stores the digital content items 236 on local storage of the client device 206. In box 509, the client application 245 loads the digital content item(s) 236 in response to a user request. For example, the user may have been prompted to load the specific digital content item 236.

In box 512, the client application 245 shows the authentication token 233 within the digital content item 236. For example, the authentication token 233 may be plainly apparent when the user accesses the digital content item 236 through the client application 245. Alternatively, the client application 245 may decode a steganographically encoded authentication token 233 from the digital content item 236 and render it in a format understandable by the user.

In box 515, the client application 245 may then remove the digital content items 236 and/or the authentication tokens 233 from the client device 206. Thereafter, the operation of the portion of the client application 245 ends.

Figure 6:
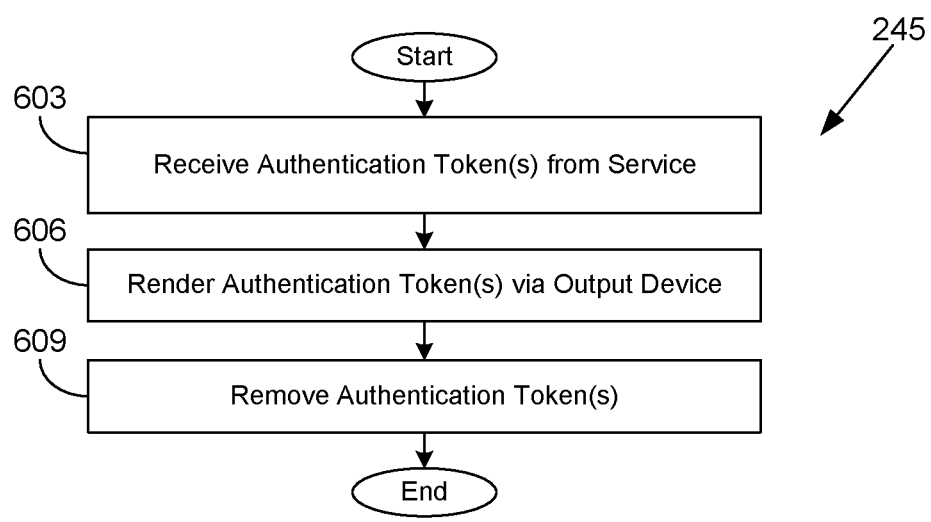

Referring next to FIG. 6, shown is a flowchart that provides one example of the operation of another portion of the client application 245 according to various embodiments. It is understood that the flowchart of FIG. 6 provides merely an example of the many different types of functional arrangements that may be employed to implement the operation of the portion of the client application 245 as described herein. As an alternative, the flowchart of FIG. 6 may be viewed as depicting an example of elements of a method implemented in the client device 206 (FIG. 2) according to one or more embodiments.

Beginning with box 603, the client application 245 receives one or more authentication tokens 233 (FIG. 2) from a service 218 (FIG. 2) via the network 209 (FIG. 2) for a user account. It is noted that the client application 245 is executed on a registered client device 206, and thus, a channel of communication exists between the client device 206 and the service 218.

In box 606, the client application 245 renders the authentication token(s) 233 via one or more output devices 257 (FIG. 2) of the client device 206 so that they may be perceived by the user and used by the user for authentication. For example, this may be a new pop-up field on an electronic book reader, an update to a lock screen on a tablet computer, or a series of colors displayed on LEDs of a voice interface device. In box 609, the client application 245 may remove the authentication tokens 233 from the client device 206. Thereafter, the operation of the portion of the client application 245 ends.

Figure 7:
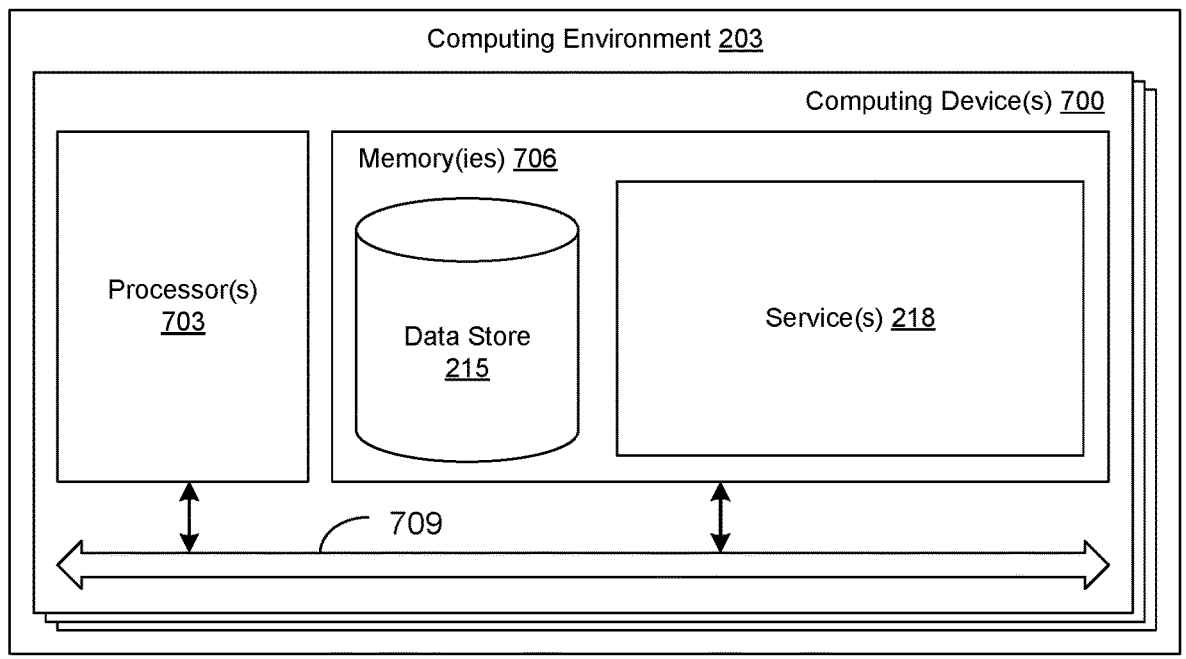
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the services 218 and potentially other applications. Also stored in the memory 706 may be a data store 215 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the service 218, the client application 245, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the service 218 and the client application 245. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service 218 and the client application 245, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the service 218 and the client application 245, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   generating, via one or more computing devices, a plurality of unique authentication tokens for a user account;
   sending, via the one or more computing devices, individual ones of the plurality of unique authentication tokens to corresponding ones of a plurality of client devices registered to the user account, wherein a first unique authentication token of the plurality of unique authentication tokens is embedded within a digital content item, the digital content item comprising at least one of: video content, audio content, or an electronic book, and a second unique authentication token of the plurality of unique authentication tokens specifies a sequence of illuminations for at least one lighted indicator of one of the plurality of client devices, wherein the digital content item into which the first unique authentication token is embedded is sent to a corresponding one of the plurality of client devices before an authentication request is received from a user;

receiving, via the one or more computing devices, the authentication request originated by the user;

responsive to receiving the authentication request, prompting, via the one or more computing devices, the user to access the digital content item in order to provide the first unique authentication token; and authenticating, via the one or more computing devices, the user for access to the user account based at least in part on the user providing at least N unique authentication tokens of the plurality of unique authentication tokens, the at least N unique authentication tokens including the first unique authentication token, wherein N is an integer greater than one.

2. The method of claim 1, wherein the plurality of client devices include at least two of: a smartphone, an electronic book reader, a tablet computer, a voice interface device, or a laptop computer.

3. The method of claim 1, wherein the digital content item is the audio content, and the first unique authentication token is embedded into the audio content as a sequence of sounds.

4. The method of claim 1, further comprising disabling, via the one or more computing devices, the user account in response to a security compromise before the authentication request is received.

5. The method of claim 1, wherein the digital content item is the electronic book, and the first unique authentication token is embedded in the electronic book as a sequence of words on a particular page.

6. A system, comprising:
at least one computing device; and
at least one service executable in the at least one computing device, wherein when executed the at least one service causes the at least one computing device to at least:
generate an authentication token for a user account;
embed the authentication token within a digital content item, the digital content item comprising at least one of: video content, audio content, or an electronic book;
send the digital content item to a first client device that is registered to the user account so that the digital content item is preloaded on the first client device prior to receiving an authentication request to authenticate a user for access to the user account;
responsive to receiving the authentication request, prompt the user to access the digital content item in order to provide the authentication token; and
authenticate the user for access to the user account based at least in part on the user providing the authentication token embedded within the digital content item.

7. The system of claim 6, wherein the digital content item is the video content, and the authentication token is embedded into one or more pixels of the video content.

8. The system of claim 6, wherein when executed the at least one service further causes the at least one computing device to at least:
generate another authentication token for the user account;
cause a second client device registered to the user account to present the other authentication token by way of a sequence of illuminations of at least one light emitting diode (LED) on the second client device; and
wherein the user is authenticated for access to the user account further based at least in part on the user providing information describing the sequence of illuminations.

9. The system of claim 6, wherein the user is authenticated for access to the user account further based at least in part on the user providing location or position information associated with a second client device.

10. The system of claim 6, wherein when executed the at least one service further causes the at least one computing device to at least:
generate another authentication token for the user account;
cause a second client device registered to the user account to present the other authentication token within a user interface; and
wherein the user is authenticated for access to the user account further based at least in part on the user providing the other authentication token.

11. The system of claim 6, wherein the digital content item is the video content, and the authentication token is encoded into the video content as a character string.

12. The system of claim 6, wherein the digital content item corresponds to a special-purpose digital content item provided to facilitate authentication.

13. The system of claim 6, wherein the authentication token is embedded in the digital content item in a steganographic form, and an application executed in the first client device is configured to decode the authentication token from the steganographic form.

14. The system of claim 6, wherein the first client device is associated with a registration authentication token that identifies the first client device to the at least one service.

15. The system of claim 6, wherein the digital content item corresponds to an electronic book, and the authentication token corresponds to a sequence of words on a particular page.

16. The system of claim 6, wherein the user provides the authentication token to an agent via a text message or a telephone call.

17. A method, comprising:
generating, via one or more computing devices, an authentication token for a user account;
embedding, via the one or more computing devices, the authentication token within a digital content item, the digital content item comprising at least one of: video content, audio content, or an electronic book;
sending, via the one or more computing devices, the digital content item to a first client device that is registered to the user account so that the digital content item is preloaded on the first client device prior to receiving an authentication request to authenticate a user for access to the user account;
responsive to receiving the authentication request, prompting, via the one or more computing devices, the user to access the digital content item in order to provide the authentication token; and
authenticating, via the one or more computing devices, the user for access to the user account based at least in part on the user providing the authentication token embedded within the digital content item.

18. The method of claim 17, wherein embedding the authentication token within the digital content item further comprises embedding, via the one or more computing devices, the authentication token within the digital content item in a steganographic form, and an application executed in the first client device is configured to decode the authentication token from the steganographic form.

19. The method of claim 17, further comprising:
- generating, via the one or more computing devices, another authentication token for the user account;
- causing, via the one or more computing devices, a second client device registered to the user account to present the other authentication token within a user interface; and
- wherein authenticating the user for access to the user account further comprises authenticating, via the one or more computing devices, the user for access to the user account further based at least in part on the user providing the other authentication token.

20. The method of claim 17, wherein authenticating the user for access to the user account further comprises authenticating, via the one or more computing devices, the user for access to the user account further based at least in part on the user providing location or position information associated with a second client device.

\* \* \* \* \*